United States Patent [19]

Yi Su

[11] Patent Number: 4,676,289

[45] Date of Patent: Jun. 30, 1987

[54] AUTOMOBILE TIRE HAVING RETRACTABLE TREAD STUDS

[76] Inventor: Cherng Yi Su, 1200 W. 2nd St., Reno, Nev. 89503

[21] Appl. No.: 726,164

[22] Filed: Apr. 22, 1985

Related U.S. Application Data

[63] Continuation-in-part of Ser. No. 639,703, Aug. 13, 1984, abandoned.

[51] Int. Cl.⁴ .................. B60C 11/16; B60C 5/24; B60C 29/00
[52] U.S. Cl. .................. 152/210; 141/38; 141/98; 152/337.1; 152/417; 152/456; 188/6
[58] Field of Search .............. 152/208, 210, 209 R, 152/160, 331.1, 334.1, 337.1, 339.1, 340.1, 452, 455, 456, 415, 416, 417; 156/114; 141/38, 98; 188/5, 6; 285/190

[56] References Cited

U.S. PATENT DOCUMENTS

| | | | |
|---|---|---|---|
| 1,915,161 | 6/1933 | Jordan | 152/416 X |
| 2,491,491 | 12/1949 | Freygang | 152/208 |
| 2,841,199 | 7/1958 | Voelkel et al. | 152/208 |
| 2,989,989 | 6/1961 | Whaley et al. | 137/625.25 |
| 3,095,918 | 7/1963 | Mike | 152/208 |
| 3,340,921 | 10/1965 | Garfinkle | 152/208 |
| 3,516,466 | 1/1968 | Smit | 152/208 |
| 3,665,992 | 5/1972 | Rossel | 152/208 |
| 3,672,421 | 6/1972 | Anderson | 152/208 |
| 3,712,358 | 1/1973 | Einarsson | 152/208 |

Primary Examiner—Donald E. Czaja
Assistant Examiner—Thomas Bokan
Attorney, Agent, or Firm—Bruce & McCoy

[57] ABSTRACT

An automobile tire having retractable tread studs for increasing traction of the tire on slippery surfaces which are actuated by air pressure that is controlled by the automobile driver from the driver's seat.

1 Claim, 10 Drawing Figures

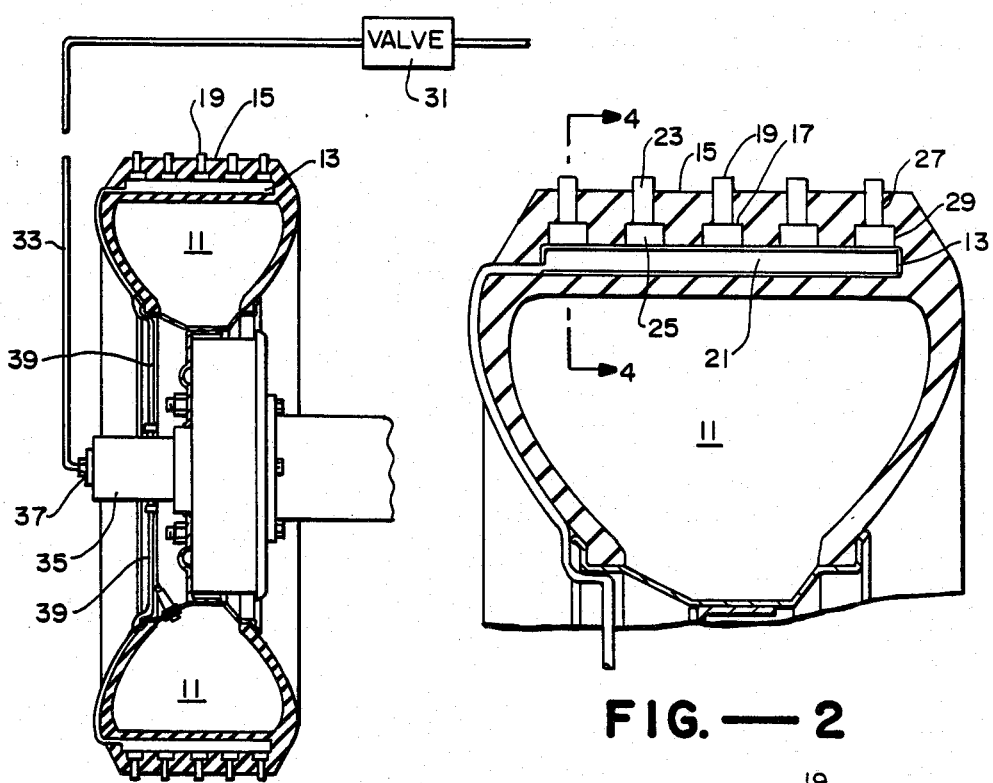
FIG.—1
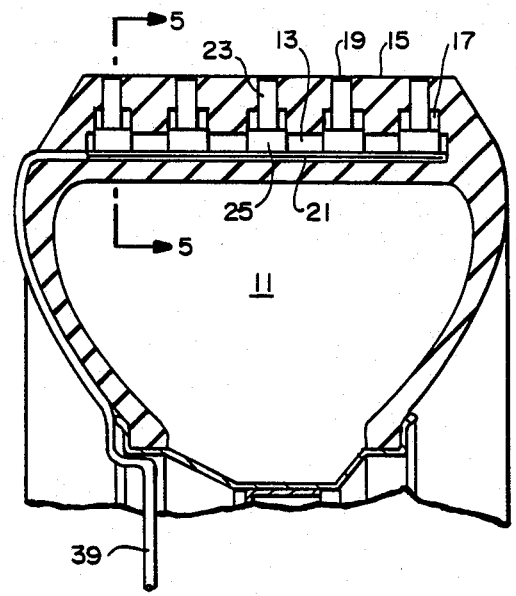
FIG.—2
FIG.—3
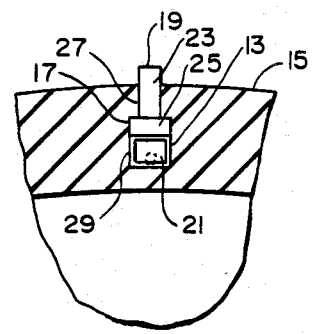
FIG.—4
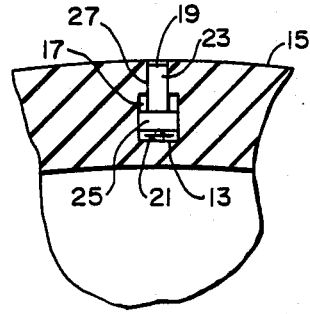
FIG.—5

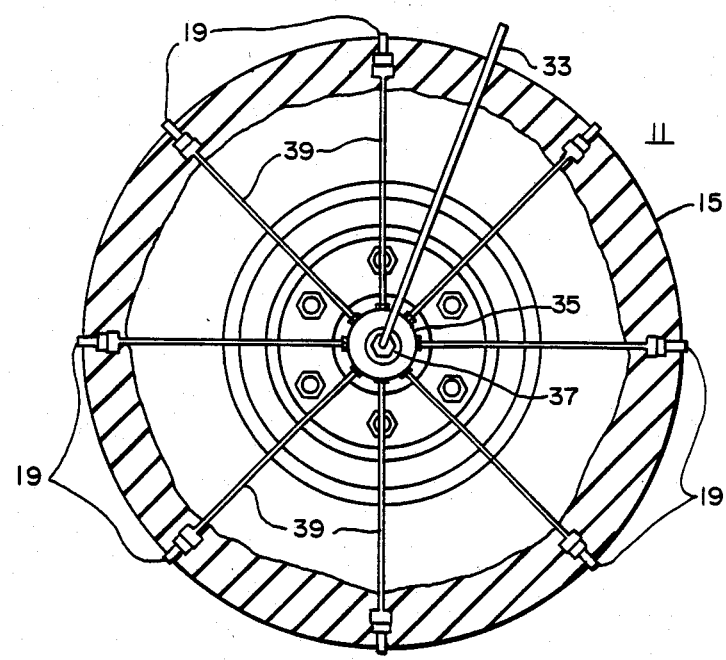
FIG.—6
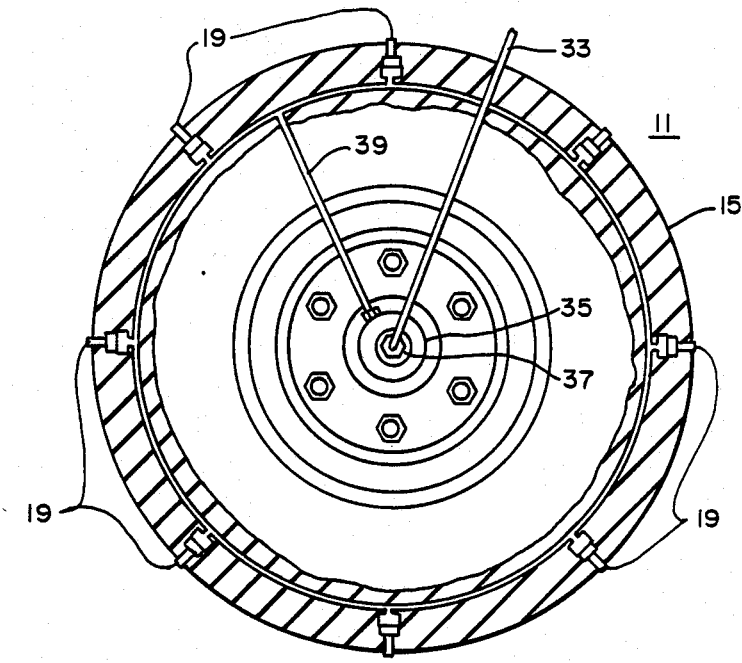
FIG.—7

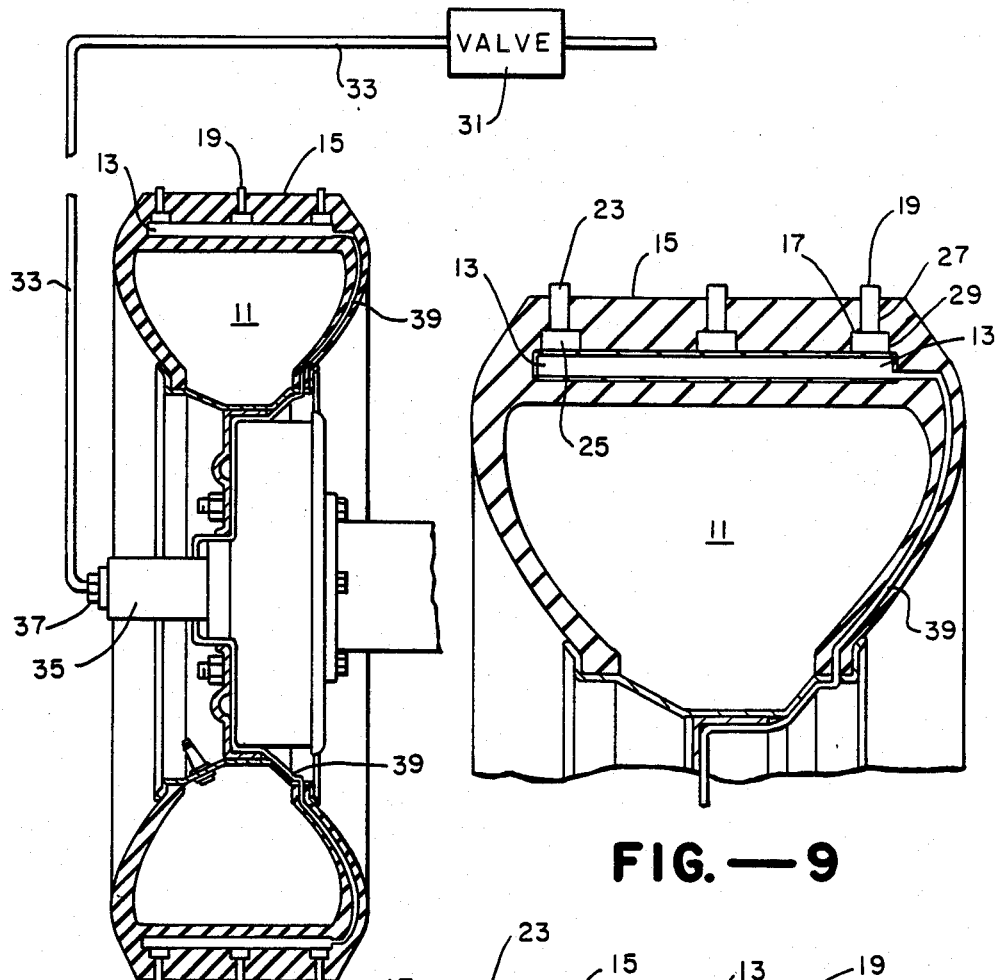
FIG.—8
FIG.—9
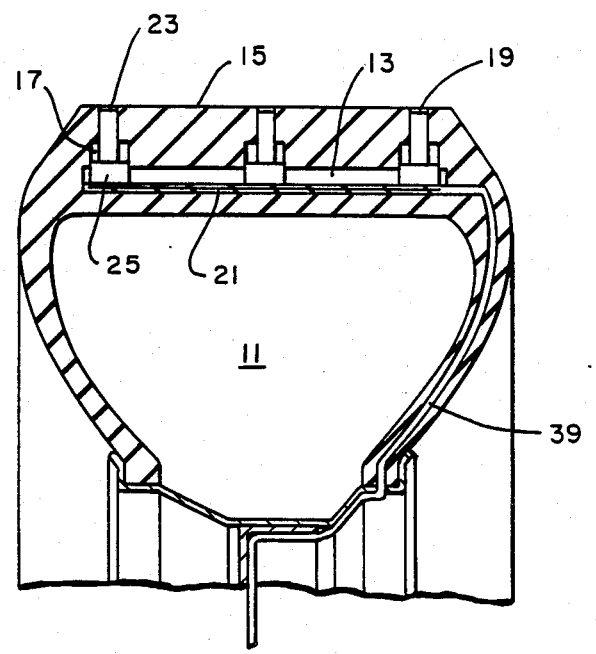
FIG.—10

AUTOMOBILE TIRE HAVING RETRACTABLE TREAD STUDS

CROSS-REFERENCE TO RELATED APPLICATION

This is a continuation-in-part of U.S. patent application Ser. No. 639,703 filed Aug. 13, 1984, now abandoned, and having the same title.

FIELD OF THE INVENTION

The present invention relates to automobile tires and, more particularly, to an automobile tire having retractable tread studs for increasing the traction of the tire on slippery surfaces which can be extended and retracted even when the vehicle is moving by actuation of a switch controlled by the automobile driver from the driver's seat.

DESCRIPTION OF THE PRIOR ART

Numerous devices and apparatus have been designed for the purposes of increasing traction of automobile tires under slippery conditions. Several of these designs have included retractable studs or other projections which can be raised or lowered with respect to the surface of the tire tread for this purpose. Some of these designs include the concept of permitting the vehicle driver to control the raising or lowering of these projections from inside the car when a dangerous situation occurs. This generally requires that the system be actuated either electrically, hydraulically, or by compressed air in order for the cost of the apparatus to be within reason.

The present invention, like some of the prior art, utilizes compressed air for actuating studs on a tire. Therefore, systems which are controlled by a vehicle driver and capable of delivering compressed air to the vehicle tires for the purpose of regulating the pressure therein will necessarily be included in the consideration of the prior art.

U.S. Pat. No. 3,766,956 to Ruane et al. for a Tire Structure, issued Oct. 23, 1973, discloses a vehicle tire having reciprocating studs which project beyond the tire tread. A diaphragm mounted inside of the tire engages the head of the studs and when air pressure is introduced between the diaphragm and a boot mounted in the tire, portions of the diaphragm engaging the heads of the studs move outwardly driving the studs to operative projecting position. In order to operate the diaphragm, air pressure must be applied to each one of the tires individually when the car is at rest. It cannot be actuated by the driver of the car from the driver's seat or while the car is moving.

U.S. Pat. No. 2,841,199 to Voelkel, et al. for a Traction Increasing Assembly For Vehicle Tires, issued July 1, 1958, discloses an apparatus for achieving the same results as the invention discloses herein. However, that device includes air valves located in the sidewall of a tire which must be mechanically actuated by a plunger. The plunger, which is not attached to the tire per se must be aligned with the air valve to actuate the system. It is believed that the accurate alignment required between the actuating plunger and the air valve disposed in the tire is very difficult to achieve and, further, that the system would most likely become inoperative under those conditions in which the traction-increasing mechanism is most required. In conditions where snow and ice are on the road, they would lodge around and between the valve and the plunger and freeze up the system and prevent it from working.

U.S. Pat. No. 2,781,813 to Ferguson for a Traction Wheel Construction, issued Feb. 19, 1957, discloses retractable studs disposed in the tread of the tire which can be actuated into operative position electrically through a small compressor mounted in the wheel. While the intended result of the concept is similar to that of the present invention, it is believed to be impracticable because air pumps or compressors with the electric motor required to drive them in order to develop the volume of air and pressure necessary to hold the projecting studs in operative position when the weight of the vehicle is on the tire are much larger than can be mounted in a tire.

U.,S. Pat. No. 2,491,491 to Freygang for a Pneumatic Tire and Anti-Skid Mens Therefor, issued Dec. 20, 1949, shows a tire having a multiplicity of elongated cavities disposed cross-wise to the tire around the periphery thereof. All of the cavities communicate with a common air pressure supply whereby when a switch is thrown by the vehicle operator, air pressure enters the cavities and causes lumps to form on the tire proximate the cavities in the tire tread. It is believed that this is impracticable to achieve: tire treads will not deform sufficiently and if they did the lumps would simply cause a bumpy ride. The bumps on the tire would not effectively grip an icy surface but simply slide over it. It is believed that studs are the necessary way to prevent slippage of rubber tires on hard packed snow, wet roads, and ice.

U.S. Pat. No. 3,672,421, to Anderson, for Snow Tire With Retractable Studs, issued June 27, 1972, shows a tire having retractable studs which can be moved into operative position by releasing air pressure in air tubes which run around the periphery of the internal wall of the tire. While the description of the invention and the specificiation of the patent says that it is possible to operate the valves which control the studs by means of an electro-magnet, it is believed that such action will not occur at the rotational speeds at which tires normally turn, or if the brakes are locked, which easily occurs on ice and wet roads, the studs cannot be activated because the tire does not rotate to pass the valve past the electro-magnet unless by chance the tire is locked with the magnet exactly in alignment with the valve.

Finally, U.S. Pat. No. 1,915,161, to Jordan for Apparatus for Inflating and Testing the Air Pressure In Pneumatic Tires, issued June 20, 1933, discloses a means of delivering air pressure to all four tires on a car which is controllable by the driver as do U.S. Pat. Nos. 2,146,102, and 2,213,539, to Weigand, issued Feb. 7, 1939, and Sept. 3, 1940, respectively. Other patents showing apparatus for remotely controlling the internal pressure of pneumatic tires are shown in U.S. Pat. No. 2,989,999, to Holbrook, issued June 27, 1961, and U.S. Pat. No. 4,154,279 to Tsuruta, issued May 15, 1979. While these patents do not disclose tire tread studs which are actuated by air pressure, they do show means of delivering and controlling air pressure inside the tires which is a necessary element of the present invention.

None of the cited prior art references disclose the compressed air control system of the present invention and each has its particular disadvantages. While the tire as disclosed by the present invention is more expensive to manufacture than a conventional tire, it is believed that the advantages disclosed herein overcome the disadvantages apparent in the prior art.

SUMMARY OF THE INVENTION

The present invention is an automobile tire having retractable tread studs. It includes a pneumatic tire having a multiplicity of elongated cavities of a length approaching the width of the tire tread. The cavities are disposed proximate the periphery of the tire at spaced intervals there around and are oriented with their longitudinal axis parallel to the rotational axis of the tire and just below the surface of the tread of the tire. A multiplicity of inflatable bags are disposed one each in said cavities for filling the space of said cavities when inflated.

A multiplicity of retractable tire studs are disposed integral to the tread of the tire spaced across the tread of the tire proximate each of the cavities. The studs are formed to extend beyond the surface of the tire tread a specific distance when urged radially outward from the tire by the inflatable bags. They retract to a position below the surface of the tread when the inflatable bags are deflated.

A controllable source of air supply is connected to each of the inflatable members and is operable by the driver of the automobile on which the tire is mounted.

When the vehicle driver actuates the control valve for the air pressure and causes it to inflate the bags in the cavities in the tires, the studs are pushed outward and project beyond the tread of the tire. These studs provide traction between the tire and the slippery surface over which the vehicle is travelling. When the air pressure is vented from the bags in the cavities, the studs retract as the tire rotates and the contact of the studs with the pavement pushes them back into the tire below the tread level.

OBJECTS OF THE INVENTION

It is therefore an important object of the present invention to provide retractable tire studs for increasing the traction of an automobile tire with slippery pavement.

It is another object of the present invention to provide a tire with retractable tread studs which can be actuated in emergencies by the vehicle driver while the vehicle is moving with the tires either rotating or locked, as might be the case on a slippery surface.

It is a further object of the present invention to provide an automobile tire with retractable tread studs which automatically retract when the driver deactivates the system.

It is still another object of the present invention to provide a light weight quick acting retractable tire tread stud apparatus which will operate in cold weather and under adverse conditions because of the simplicity of the mechanism.

Other objects and advantages of the present invention will become apparent when the preferred embodiment thereof as described in this specification is considered in conjunction with the accompanying drawings.

DESCRIPTION OF THE DRAWINGS

FIG. 1 is a partial section in front elevation of a tire of the present invention shown mounted on the brake drum of an automobile;.

FIG. 2 is a partial section of a tire of the present invention showing the retractable studs projecting in operative position;

FIG. 3. is another view of FIG. 2 showing the retractable studs of the present invention deactivated and retracted to their inoperative position;

FIG. 4 is a partial section taken along lines 4—4 of FIG. 2;

FIG. 5 is a partial section taken along lines 5—5 of FIG. 3;

FIG. 6 is a side elevation in partial section of a tire of the present invention employing a first means of delivering air pressure for actuating the retractable studs of the present invention;

FIG. 7 is a side elevation in partial section of a tire of the present invention employing an alternative means from FIG. 6 of delivering air pressure for actuating the retractable studs of the present invention;

FIG. 8 is an alternative embodiment of the present invention of FIG. 1 showing an alternative means of routing air pressure for actuating the retractable studs of the present invention;

FIG. 9 is a partial section of the tire of FIG. 8 showing the retractable studs projecting in operative position and FIG. 10 is another view of FIG. 9 showing the retractable studs deactivated and retracted to their inoperative position.

DESCRIPTION OF THE PREFERRED EMBODIMENT

The pneumatic tire of the present invention shown in FIG. 1 having retractable tread studs comprises an automobile or truck tire 11 having a multiplicity of elongated cavities 13 disposed proximate the periphery of the tire at spaced intervals there around. The cavities are disposed just below the surface of the tire tread 15 as shown in FIGS. 2 and 3 and extend from edge to edge of the tire tread. While the elongated cavities could be angulated with respect to the tread, in the preferred embodiment, they have their longitudinal axis disposed parallel to the rotational axis of the tire and have a length approaching the width of the tire tread. The cavities are of a generally rectangular cross section, as shown in FIGS. 4 and 5, but include a multiplicity of outwardly extending side cavities 17 which contain the reciprocable tread studs 19.

A multiplicity of retractable tread studs 19 are disposed integral to the tread of the tire and in the preferred embodiment are spaced there across in straight lines proximate each of the cavities. The studs are formed to extend beyond the surface of the tread a specific distance when urged outward by inflatable bags 21 disposed in the cavities and to retract to a position below the surface of the tread when the bags are deactivated or deflated. The tread studs 19 have a T-cross section with the projecting stud portion 23 being cylindrical. The T head 25 on the stud is also of cylindrical configuration in the preferred embodiment for ease of manufacture and minimum surface area in contact with the tire so that the friction of the stud within the tire does not prevent it from being forced outward when the inflatable bags are activated. However, other configurations of the stud and its T head could of course be employed.

The tire is formed to limit the radially outward travel of the studs by providing a stop for the T head on the stud internally of the tire. In the preferred embodiment the stop for the T head of the studs includes radially outward projecting holes in the tire treads having different diameters of generation. The outermost portions 27 of the holes are approximately the same diameter as the projecting stud portion 23 of the reciprocable studs and the innermost portion 29 of the each of the holes is larger in diameter and approximately the same size as the T head portion 25 of the studs. The innermost portions of the holes have a length to accomodate the length of the T head portions of the stud in the extended position. The transition plane between the innermost larger diameter portion of the hole 29, which contains the body or T head of the stud, and the smaller diameter outer peripheral holes 27 provides the stop for the studs in the extended position. The innermost ends of these holes 29, of course, are in communication with the elongated cavities 13 which are disposed transversely to the tread of the tire.

If a tighter fit is desired around the studs 19 to prevent water from entering into the cavity where the inflatable bag is disposed, and also to prevent the studs from being projected into operative position through the centrifugal force when the studs are supposed to be in retracted position, springs could be disposed around the cylindrical portion 23 of the stud between the tread of the tire and the T head 25 on the studs to overcome the added resistance of a tight fit.

A multiplicity of inflatable bags 21 like tough balloons are disposed one each in the cavities and fill the space of the cavities and force the studs radially outward when they are inflated. In the preferred embodiment, the inflatable bag can be provided with a corrugated sidewall or just as suitable can be a cylindrical type balloon.

A controllable source of air supply is connected to each of the inflatable bags and is operable by the driver of the vehicle on which the retractable tread stud tires are mounted. The source of air can either be a compressor powered by the vehicle engine, or electrically driven, or it could be a bottle of compressed air located under the hood or in the trunk of the car. The air supply is controlled by a valve 31 which either can be manually operated by the driver of the car or electrically actuated by a remote control button located within the driver's reach.

The air source includes compressed air delivery tubes 33 as shown in FIGS. 1, 6 and 7 which deliver the air to a distributor or manifold 35 mounted in or on the hub of the wheel through a rotatable connection 37. Individual air delivery tubes 39 can radiate from the manifold to each of the inflatable bags disposed in the elongated cavities as shown in FIG. 6. The distributor or manifold delivery system of the present invention shown in FIGS. 1, 6 and 7 was disclosed in the more than 50 year old U.S. Pat. No. 1,915,161 to Jordon described earlier. More sophisticated rotatable compressed air connections have been developed since that time which can be utilized for the present invention. Since the wheel moves up and down with relation to the frame or body of the car, a flexible compressed air hose 33 must be utilized to connect the air source which is mounted on the frame or in the body of the car to the moveable wheel.

Alternatively, an air delivery channel or channels could be formed in the sidewall of the tire communicating with each of the air bags and only one or two air delivery tubes run from the manifold to the sidewall air channel as shown in FIG. 7. Likewise it is possible to locate the air delivery tubes 39 on the inside of the tire by routing them through the wheel rim, between the brake drum and the rim, then up to the cavities as shown in FIGS. 8-10 to protect the air lines from being rubbed against curbs.

The present invention has numerous advantages over the prior art with the main one being that the air system which activitates the studs is a closed system whereby it can be quickly and easily actuated by the driver of the car by simply pressing a button, if it is electrically controlled, or moving a control knob to allow the compressed air to move from the source into the delivery system and actuate the studs so that they can project from the tread of the tire. It can be used almost instantly if the car goes into a slide or spin so that the driver can recapture control of the car before it crashes or goes off the road. The control valve also has a vent position so that the operator can simply vent the compressed air from the delivery lines. Rotation of the wheel on the road will automatically push the studs back into the recessed position when the studs rotate to contact the pavement.

Thus, it will be seen from this description of the preferred embodiment of the present invention that all of the objects and advantages attributable thereto have been attained. While the invention has been described in considerable detail, the invention is not to be limited to such details as have been set forth except as may be necessitated by the appended claims.

I claim:

1. A tire having retractable tread studs comprising a tire having a multiplicity of elongated cavities disposed proximate the periphery of the tire at spaced intervals there along, said cavities being disposed just below the surface of the tire tread and of a length approaching the width of the tire tread, said cavities having their longitudinal axis disposed parallel to the rotational axis of the tire, a multiplicity of inflatable bags disposed one each in said cavities for filling the space in said cavities when inflated, a multiplicity of retractable tread studs disposed integral to the tread of said tire spaced across the tread of said tire proximate each of said cavities, said studs having a T-cross section with the projecting stud portion being cylindrical and formed to extend beyond the surface of said tread a specific distance when urged outward by said inflatable bags and to retract to a position below the surface of said tread when said bags are deactivated, said studs being disposed in radially outwardly projecting circular holes formed in said tire treads integral to said elongated cavities, said circular holes having different diameters of generation with the outermost portions of said holes being approximately the same diameter as the projecting stud portion and the innermost portion of said holes being approximately the same size as the T head portion of said studs, said innermost portions of said holes having a length to accommodate the length of the T portions of said studs in the extended position and providing a stop for said studs at said extended position, and a controllable source of air supply connected to each of said inflatable bags operble by the driver of the vehicle on which the tire is mounted, said air source including a manifold mounted on the hub of the wheel and formed to rotate with said tire, a compressed air delivery tube for delivering compressed air to said manifold through a rotatable connection a portion of which rotates with said manifold and a portion of which is secured to a delivery line which is a non-rotating member, and compressed air delivery tubes radiating from the manifold of said wheel connecting to each of said inflatable bags in said elongated cavities.

* * * * *